Figure 7:
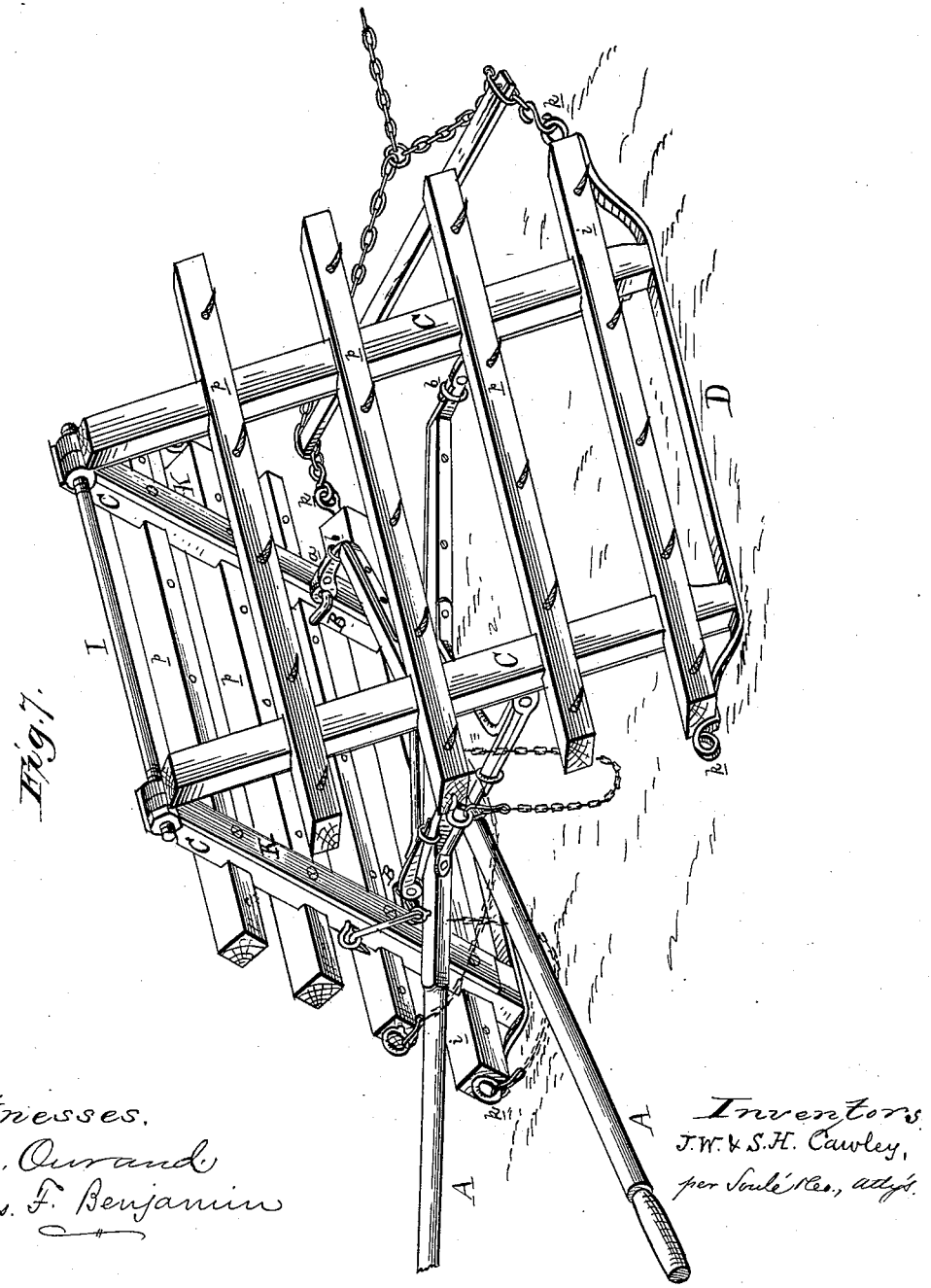

(No Model.) 3 Sheets—Sheet 1.
J. W. & S. H. CAWLEY.
HARROW.
No. 251,411. Patented Dec. 27, 1881.
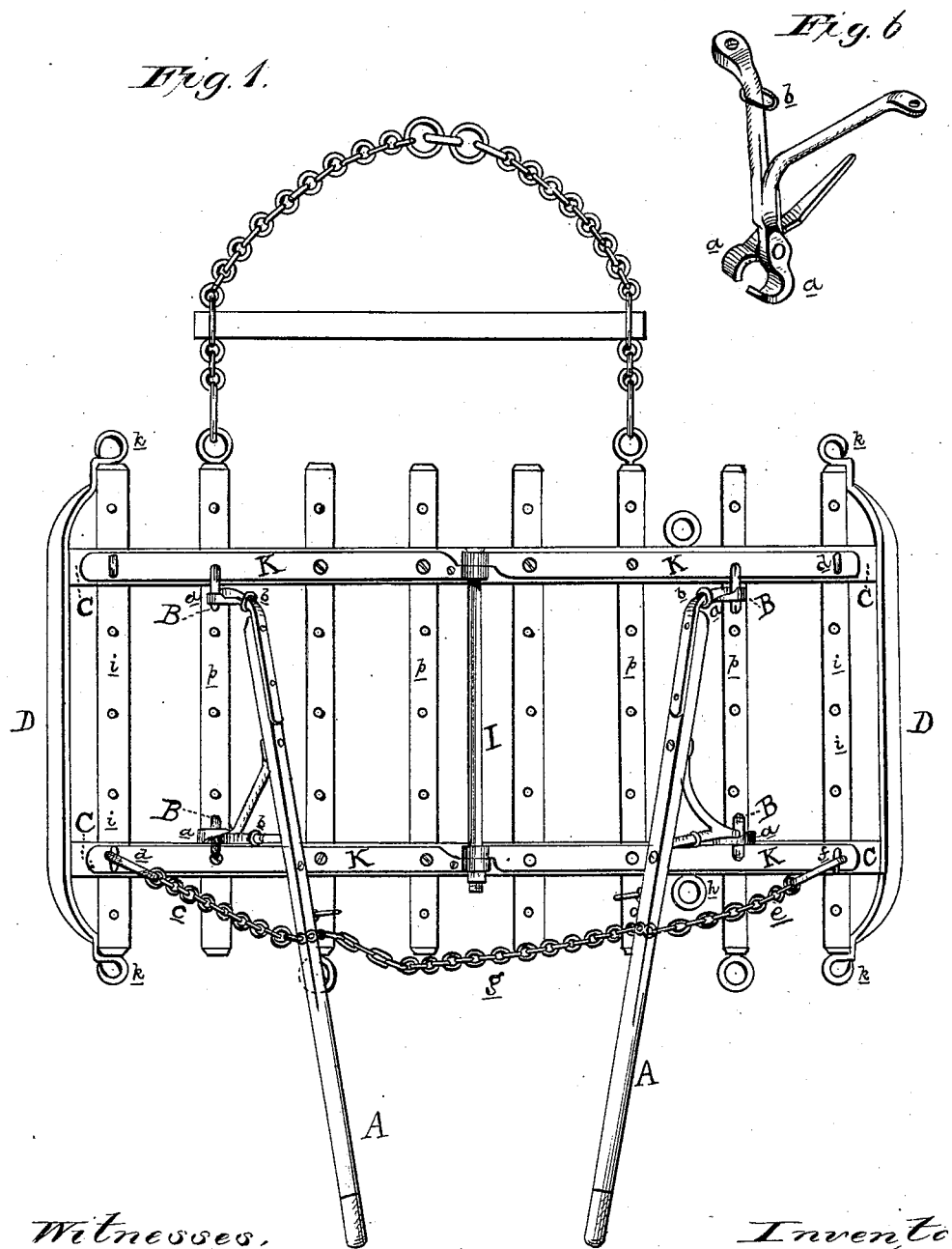

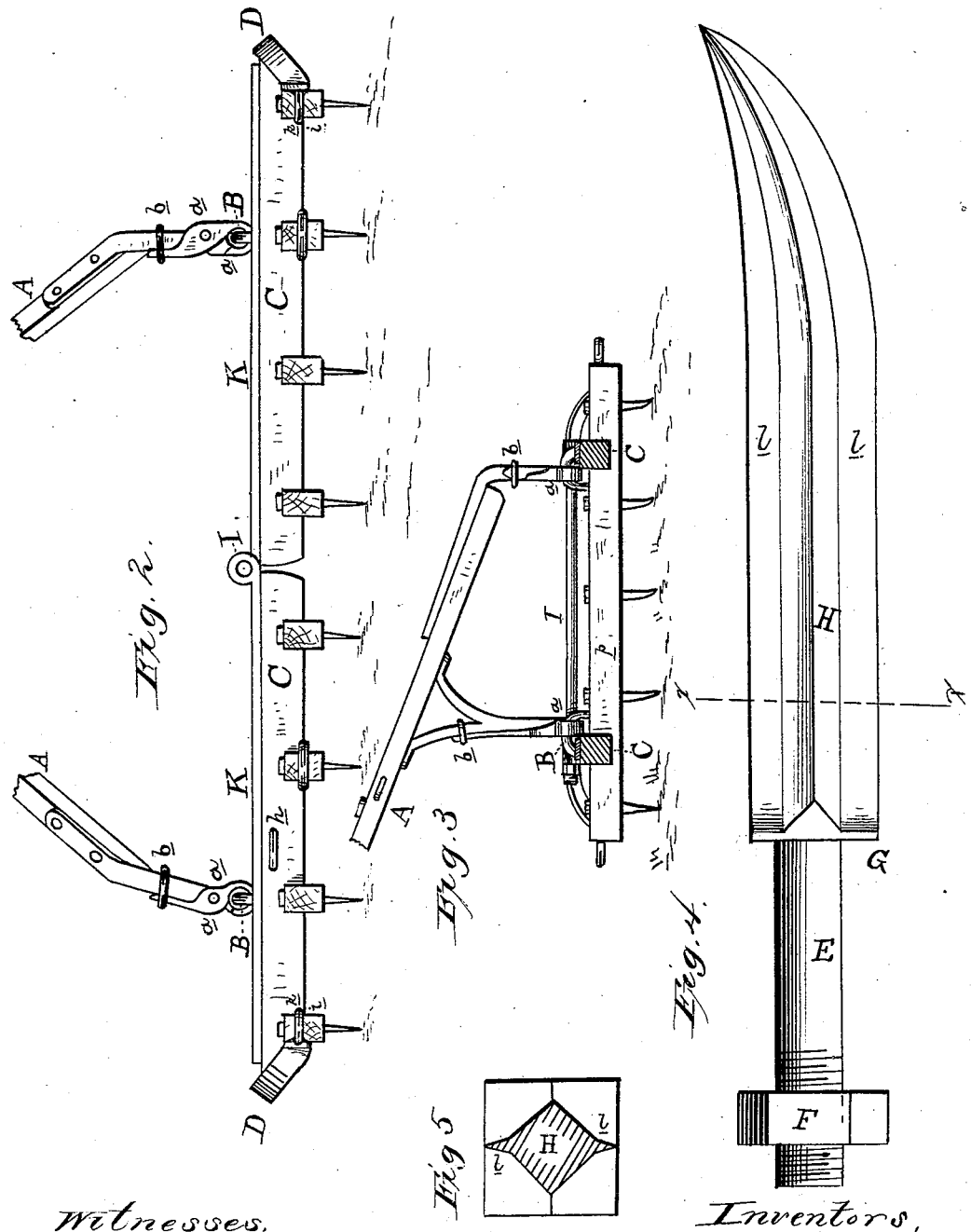

(No Model.)

J. W. & S. H. CAWLEY.
HARROW.

3 Sheets—Sheet 3.

No. 251,411. Patented Dec. 27, 1881.

Witnesses.
F. L. Durand
Chas. F. Benjamin

Inventors
J. W. & S. H. Cawley,
per Soulé & Co., att'ys.

UNITED STATES PATENT OFFICE.

JOHN W. CAWLEY AND SAMUEL H. CAWLEY, OF EL DORADO, OHIO.

HARROW.

SPECIFICATION forming part of Letters Patent No. 251,411, dated December 27, 1881.

Application filed July 21, 1881. (No model.)

*To all whom it may concern:*

Be it known that we, J. W. CAWLEY and S. H. CAWLEY, citizens of the United States, residing at El Dorado, in the county of Preble and State of Ohio, have invented certain new and useful Improvements in Harrows; and we do hereby declare the following to be full, clear, and exact description of the invention, such as will enable others skilled in the art to which it appertains to make and use the same, reference being had to the accompanying drawings, and to the letters or figures of reference marked thereon, which form a part of this specification.

Our invention relates to reversible harrows; and its objects are, first, to facilitate the reversing of the harrow when a change of work is desired, and, secondly, to increase the penetrability of the tooth generally used in reversible harrows. These objects we accomplish by means of lifting-handles made detachable and adjustable, so as to operate from either of the two ends of the harrow-frame, and by a thin wedge-shaped front extension of either edge of the harrow-tooth.

In the accompanying drawings, Figure 1 is a top perspective view of a double harrow provided with our reversible lifting-handles and the appliances connected therewith. Fig. 2 is a front perspective thereof. Fig. 3 is a side perspective thereof. Fig. 4 is a side perspective view of a harrow-tooth with our extended edges. Fig. 5 is a cross-section of the tooth-blade. Fig. 6 is an enlarged perspective view of our handle-catches, and Fig. 7 is a side and rear perspective of our handles folded and secured when the harrow is mounted upon its customary runners for a change of location.

Like letters refer to like parts in the several drawings.

A A are lifting-handles, armed with pincher-shaped jaws $a\ a$, which grasp the metal staples B B and are secured and released by means of the sliding rings $b\ b$. One arm of each staple B B, serves also as a bolt to bind together the hinge-plates K K, the hinge-bars C C, and the tooth-bars $p\ p$. When both handles are used they are connected and operated together by means of the chains $c, e$, and $g$, hooked to the eyes $d$ and $f$. When but one handle is used the jaws $a\ a$ are secured upon the long hinge-bolt I, the chain $e$ being hooked to the screw-eye $h$ and the chain $g$ to the eye $d$.

The manner of reversing the handles is apparent from the drawings and by what is herein stated.

When the harrow is to be moved upon its runners the handles are first folded inwardly, one upon the other, in such order that the upper one can be hooked to screw-eye $h$, as shown in Fig. 7, so as to keep both and either of the handles from trailing upon the ground when the frame is turned over and stands upon the runners.

H is a double-edged tooth-blade, such as is ordinarily used in reversible harrows, and $l\ l$ are our extended edges thereon. These extended edges, by partially cleaving the soil, allow the ordinary and thicker edges of the blade to enter with less than the usual jar and friction, thus lessening the wear and tear of the tooth and diminishing the strain upon the motive power.

What we claim as new and useful in our invention, and desire to secure by Letters Patent, is as follows:

1. The combination of the lifting-handles A A, the grasping-jaws $a\ a$, the sliding rings $b\ b$, and the staples B B, substantially as and for the purposes described.

2. The combination of the lifting-handle A, the jaws $a\ a$, the sliding rings $b\ b$, and the hinge-bolt I, substantially as and for the purposes described.

3. The herein-described diamond-shaped harrow-tooth H, provided with the extended blade-edges $l\ l$, substantially as and for the purpose set forth.

In testimony whereof we affix our signatures in presence of two witnesses.

JOHN W. CAWLEY.
S. H. CAWLEY.

Witnesses:
JAMES M. CAWLEY,
CHARLEY S. JUDY.